United States Patent
LaRue

(10) Patent No.: US 10,104,720 B1
(45) Date of Patent: Oct. 16, 2018

(54) PORTABLE RECHARGEABLE HEATING BLANKET SYSTEM

(71) Applicant: Paul LaRue, Oceanside, CA (US)

(72) Inventor: Paul LaRue, Oceanside, CA (US)

( * ) Notice: Subject to any disclaimer, the term of this patent is extended or adjusted under 35 U.S.C. 154(b) by 363 days.

(21) Appl. No.: 15/198,247

(22) Filed: Jun. 30, 2016

Related U.S. Application Data

(60) Provisional application No. 62/187,405, filed on Jul. 1, 2015.

(51) Int. Cl.
| | |
|---|---|
| A61B 8/08 | (2006.01) |
| H05B 3/34 | (2006.01) |
| H02J 7/00 | (2006.01) |
| H02J 7/14 | (2006.01) |
| H01M 10/0525 | (2010.01) |
| H01M 10/623 | (2014.01) |
| H01M 10/44 | (2006.01) |

(52) U.S. Cl.
CPC ........ *H05B 3/342* (2013.01); *H01M 10/0525* (2013.01); *H01M 10/44* (2013.01); *H01M 10/623* (2015.04); *H02J 7/007* (2013.01); *H02J 7/0029* (2013.01); *H02J 7/0045* (2013.01); *H02J 7/14* (2013.01); *H01M 2220/30* (2013.01); *H02J 2007/0095* (2013.01)

(58) Field of Classification Search
CPC .............. H05B 3/342; H05B 2203/003; H05B 1/0227; H05B 2203/035
USPC ....... 219/212, 486, 488, 494, 497, 501, 504, 219/505, 516, 528, 529, 549, 545
See application file for complete search history.

(56) References Cited

U.S. PATENT DOCUMENTS

| | | | |
|---|---|---|---|
| 4,031,352 A | 6/1977 | Oosterberg | |
| 4,788,417 A * | 11/1988 | Graflind | H02H 5/043 219/212 |
| 5,008,515 A | 4/1991 | McCormack | |

FOREIGN PATENT DOCUMENTS

JP 2002067663 3/2002

* cited by examiner

*Primary Examiner* — Phuong Nguyen
(74) *Attorney, Agent, or Firm* — Integrity Patent Group, PLC; Edwin Wold

(57) ABSTRACT

A portable rechargeable li-polymer/lithium-ion battery cell operated heating blanket system for providing comfortable heat to a human body and sustaining said comfortable heat. The device provides continuous heat for users. The present invention includes a USB port for charging devices such as cellphones. The portable rechargeable li-polymer/lithium-ion battery cell operated heating blanket system includes microplush comfort on the inside and a water resistant exterior.

17 Claims, 5 Drawing Sheets

PORTABLE RECHARGEABLE HEATING BLANKET SYSTEM

CROSS-REFERENCE TO RELATED APPLICATION

The present application is related to and claims priority from prior provisional application Ser. No. 62/187,405, filed Jul. 1, 2015 which application is incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of heating blanket and more specifically relates to a portable rechargeable li-polymer/lithium-ion battery cell operated heating blanket system.

DESCRIPTION OF RELATED ART

An electric blanket is a blanket with an integrated electrical heating device usually placed above the top bed sheet. In the United Kingdom and Commonwealth, electric blanket commonly refers to an electric underblanket (electric mattress pad), which is placed below the bottom bed sheet. Electric blankets usually have a control unit which adjusts the amount of heat the blanket produces. Blankets for larger sized beds often have separate controls for each side of the bed. The electric blanket may be used to pre-heat the bed before use or to keep the occupant warm while in bed.

Old or damaged blankets concern fire safety officials internationally. The use of such blankets is of concern due to the combination of heat, electricity, the abundance of flammable bedding material, and a sleeping occupant. Electric blankets also present a burn risk to those who cannot feel pain or are unable to react to it. Individuals included in this group are small children, diabetics, and the elderly. A suitable solution is desired.

Several attempts have been made to solve the above-mentioned problems such as those found in U.S. Pat. No. 5,008,515 to William McCormack; U.S. Pat. No. 4,031,352 to Cedric Oosterberg and Foreign Pat. No. JP2002067663 to Hajime Shiojima. This art is representative of heating blankets. However, none of the above inventions and patents, taken either singly or in combination, is seen to describe the invention as claimed.

Preferably, a heating blanket should provide a compact lightweight means for comfortably heating the human body and, yet would operate reliably and be manufactured at a modest expense. Thus, a need exists for a reliable portable rechargeable li-polymer/lithium-ion battery cell operated heating blanket system to avoid the above-mentioned problems.

BRIEF SUMMARY OF THE INVENTION

In view of the foregoing disadvantages inherent in the known heating blanket art, the present invention provides a novel heating blanket. The general purpose of the present invention, which will be described subsequently in greater detail is to provide a portable rechargeable li-polymer/lithium-ion battery cell operated heating blanket system.

A portable rechargeable li-polymer/lithium-ion battery cell operated heating system is disclosed herein. The portable rechargeable li-polymer/lithium-ion battery cell operated heating may comprise a portable rechargeable li-polymer/lithium-ion battery cell operated heating blanket assembly having at least one blanket including an exterior side, an interior side, heating elements, a temperature sensor, and wiring, at least one controller including a switching circuit, and a control circuit, a power source having a rechargeable battery pack including a rechargeable battery cell, a steering circuit, and a safety circuit, a charger, a charging adaptor, and a controller to blanket connector.

The portable rechargeable li-polymer/lithium-ion battery cell operated heating blanket system may comprise the portable rechargeable li-polymer/lithium-ion battery cell operated heating blanket assembly. The portable rechargeable li-polymer/lithium-ion battery cell operated heating blanket assembly may comprise the at least one blanket, the at least one controller, the power source, the charger, the charging adaptor, and the controller to blanket connector structured and arranged in functional combination. The at least one blanket may comprise the exterior side, the interior side, the heating elements, the temperature sensor, and the wiring. The at least one blanket is weather resistant and washable.

The wiring, the heating elements, and the temperature sensor are encapsulated within a watertight, flexible fire resistant material housing for safety and durability in use. The at least one controller may comprise the switching circuit and the control circuit. The portable rechargeable li-polymer/lithium-ion battery cell operated heating blanket assembly is designed to detect component failures. The switch of the portable rechargeable li-polymer/lithium-ion battery cell operated heating blanket assembly in a result of the component failure defaults to an off-position.

The power source may comprise the rechargeable battery pack. The power source may comprise a 12 Volt DC, light weight, Li-on rechargeable battery. The rechargeable battery pack may comprise the rechargeable battery cell, the steering circuit, and the safety circuit. The at least one blanket is configured to connect and disconnect from the at least one controller, the power source, and the charger. The exterior side may comprise a weather resistant decorative material. The exterior side may comprise at least one decoration. The at least one decoration may comprise an ornamental design suitable for ready recognition by the user. The at least one decoration may be imprinted, embroidered, or embossed with desired graphics. The exterior side may comprise pockets for holding at least one item.

The charging adaptor is a wall adaptor. The at least one controller monitors temperature, sets temperature, controls heating zones and timer functions. The controller is weather resistant. The at least one controller controls flow of electricity between the power source and the at least one blanket. The at least one controller is designed to heat multiple zones of the at least one blanket. The at least one controller is built around an electronically controlled switch. The switch is controlled by a micro-computer chip which also monitors the temperature sensor and user input. The switch is operated by the control circuit which receives input from the user. The switch may comprise a relay.

The control circuit will operate the switch if a desired temperature is higher than a sensed temperature and allow the electricity to flow to the at least one blanket thus heating it. The safety circuit regulates charging and discharging as well as monitoring health of the rechargeable battery pack. The steering circuit controls the flow of the electricity from the rechargeable battery pack to the at least one controller. The steering circuit may comprise two schottky diodes. The steering circuit controls the flow of the electricity from the charger to the at least one controller to allow the rechargeable battery pack to be charged while the charger also powers the at least one controller. The safety circuit prevents unpredictable outside events from damaging the portable rechargeable li-polymer/lithium-ion battery cell operated heating blanket assembly. The control circuit receives feedback from the temperature sensor inside the at least one blanket.

The portable rechargeable li-polymer/lithium-ion battery cell operated heating blanket assembly is useful for providing comfortable heat to a human body and sustaining the comfortable heat According to another embodiment, a method of use is also disclosed herein. The method includes wrapping at least one blanket around a body of a user, adjusting a switch of at least one controller to desired temperature, and removing said at least one blanket.

The present invention holds significant improvements and serves as a portable rechargeable li-polymer/lithium-ion battery cell operated heating blanket system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present disclosure, portable rechargeable li-polymer/lithium-ion battery cell operated heating blanket system, constructed and operative according to the teachings of the present disclosure.

The various embodiments of the present invention will hereinafter be described in conjunction with the appended drawings, wherein like designations denote like elements.

DETAILED DESCRIPTION

Figure 1:
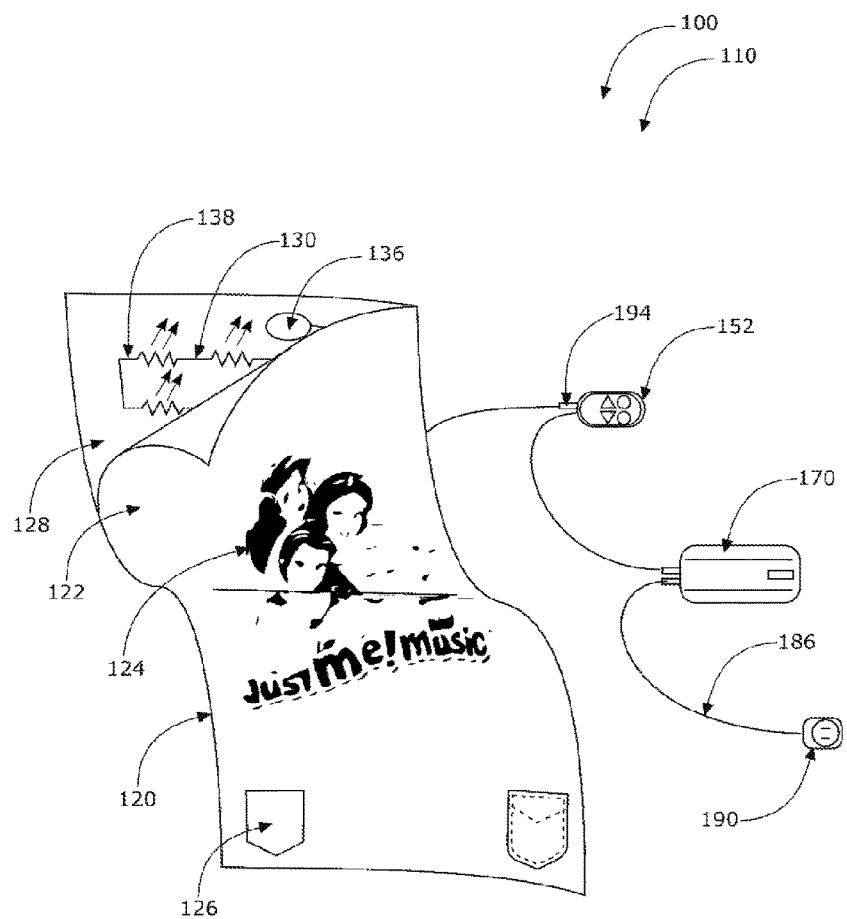
FIG. 1 shows a perspective view illustrating a portable rechargeable li-polymer/lithium-ion battery cell operated heating blanket system during an 'in-use' condition showing at least one blanket, at least one controller, a rechargeable battery pack, a controller to blanket connector, a charger, and a charging adaptor according to an embodiment of the present invention.

As discussed above, embodiments of the present disclosure relate to a heating blanket and more particularly to a portable rechargeable li-polymer/lithium-ion battery cell operated heating blanket system as used to improve the means for creating and maintaining a comfortable body temperature and the present invention replaces the use of "gel packs".

Generally speaking, portable rechargeable li-polymer/lithium-ion battery cell operated heating blanket system will warm a body of a user to a comfortable temperature either indoors or outdoors. The present invention brings comfortable heat to the human body and sustains that comfortable heat for up to 10 hours and is also very compact in size and very light weight to carry with one hand. The blanket of the portable rechargeable li-polymer/lithium-ion battery cell operated heating blanket system comprises layers. The first layer of the blanket may comprise a plush side. This layer comes in contact with the body of a user. The second layer may have heating elements including heating wires or heating panels. The third layer may comprise a mylar-like material with a reflective surface facing down. BoPET (Biaxially-oriented polyethylene terephthalate) is a polyester film made from stretched polyethylene terephthalate (PET) and is used for its high tensile strength, chemical and dimensional stability, transparency, reflectivity, gas and aroma barrier properties, and electrical insulation. A variety of companies manufacture boPET and other polyester films under different brand names. In the UK and US, the most well-known trade names are Mylar, Melinex and Hostaphan. The fourth layer may include a batting material to increase insulation and insure heat is directed to the body of the user. Lastly, the fifth layer may comprise a water resistant material.

Gel Packs for heating the human body have limited life spans. They may last up to 6 to 10 uses, but then the customer has to re-purchase additional gel packs which becomes very expensive. The present invention lasts for several years without any need for the customer to re-purchase supplies.

The present invention may be used to heat up water pipes that have a tendency to freeze in sub-freezing temperatures. Thereby allowing water to flow freely to the end user. The device may further be used for delivery services that have warm food and need those food items to stay warm until delivery.

The portable rechargeable li-polymer/lithium-ion battery cell operated heating blanket system may connect with, and disconnect from, the controller, the battery and the charger. Components not detachable from the blanket (for example, an electrical connector, or a heating element) can be safely washed and dried with care by common laundry practices if necessary. The blanket comprises an exterior side and an interior side. The exterior side will be weather resistant and decorative. Decorations may be imprinted, embroidered, embossed, etc. . . . with any desired graphics. The interior side may be designed for human comfort. The blanket may have pockets for holding the controller, the battery and other items (such as keys or a portable phone).

The controller may monitor the temperature, set temperature, control heating zones and timer functions. The controller may be weather resistant. The controller may control the flow of electricity between the battery and the blanket. The controller may have safety features to disable the flow of electricity should any component of the invention fail.

The battery may comprise a rechargeable battery cell, a steering circuit, and a safety circuit to regulate the charging and discharging as well as monitoring the health of the rechargeable battery cell. The steering circuit may control the flow of electricity from the rechargeable battery cell to the controller or from the charger to the controller to allow the rechargeable battery cell to be charged while the charger may also power the controller.

The charger may be an adapter to control the flow of electricity from a wall adapter or an automobile accessory adapter to the battery. The charger may have a safety circuit to prevent unpredictable outside events from damaging the invention (events such as a power company surge or electrical storm).

The charger may send a flow of electricity to the battery. The charger may have over-voltage and over-current safety features. Inside the battery, electricity may flow simultaneously to the steering circuit and the safety circuit. The steering circuit may detect if the charger adapter is connected or not. If the charger adapter is connected, then the steering circuit may allow electricity to flow directly from the charger to the controller. If the charger adapter is not connected, then the steering circuit may allow electricity to flow from the rechargeable battery cell to the controller. Simultaneously, the safety circuit may control the flow of electricity from the charger to the rechargeable battery cell; and, also control the flow of electricity from the rechargeable battery cell to the controller to maintain a safe rate of current according to the specifications of the rechargeable battery cell. Taken together this allows for the controller to be powered directly from the charger and for the rechargeable battery cell to remain fully charged while the charger is connected. This ensures that the invention may be initially fully charged when the charger is removed.

The battery is connected to the controller. Inside the controller a switch controls the flow of electricity between the battery and the blanket. The switch is operated by a circuit which receives input from the user regarding desired temperature, timer, and other options. The circuit also receives feedback from a temperature sensor inside the blanket as well as a means to detect component failures. If the desired temperature is higher than the sensed temperature and all components are working the circuit may then operate the switch and allow electricity to flow to the blanket thus heating it. Once the desired temperature is achieved, the circuit may operate the switch to prevent the flow of electricity to the blanket. As the temperature falls the circuit may reengage the flow of electricity to the blanket. This cycle is rather like that of a thermostat found in a home heating system. Should any component of the system fail, the switch may default to the "off" position, thus even if the control circuit itself should fail, the blanket will turn off.

The blanket may comprise an electrical plug with connections to for heating elements and temperature sensor. The plug may comprise a molded plastic exterior, all wiring, the heating elements and the temperature sensor may be encapsulated in watertight, flexible and fire resistant materials. The blanket may thus be weather resistant, safe and may be washed with care. The outer-side of the blanket may be made of weather resistant, heat retaining, fire-resistant material that may accept decorative applications, such as imprinting or embroidering. The inner-side of the blanket may be designed for comfort and safety. Pockets may be provided for convenience to hold the battery, controller and other items.

For example, one may start with a convenient 12 Volt DC electric heating blanket available for use inside a car, which is already proven and safe. Modify the material to be weather resistant and printable on the outer-side. Add in a temperature sensor, for example, a thermistor which is a resistor that varies with temperature. And install the appropriate connector to be able to disconnect the power cord. In place of the power cord, one would install the controller and battery unit.

The controller would be built around an electronically controlled switch, such as a relay or transistor. The switch would be easily controlled by an inexpensive micro-computer chip which would also monitor the temperature sensor, the health of the components and the users input.

The battery unit may use a convenient 12 Volt DC, light weight, Li-on rechargeable battery. The Li-on battery manufacturer may also have recommended safe charging and discharging circuits designed specifically for their battery. The steering circuit may simply be made with two schottky diodes.

The charger may be the same 12V automobile accessory outlet adapter that was previously disconnected and replaced with the controller and battery unit, or a convenient 12V AC adapter may be used to plug into a consumer power outlet. These units are readily available with safety features proven and time tested.

It would be necessary to have at least one charger, one battery, one controller and one blanket. Connectors between these parts, as well as pockets to hold various items, are offered for convenience, but not absolutely necessary. Optionally, various adapters may be offered for use in different environments. For example, a car adapter, a wall outlet adapter, or USB type adapter. Extra batteries would be an obvious option. The battery may be designed with an ancillary outlet to power a cell phone for example. The controller and blanket may be designed to heat multiple zones. For example, the blanket may have a separate zone for heating around the shoulders vs. heating around the torso. Further, the controller may have additional connections for heated gloves or socks. The decorations may offer limitless options for personalizing the blanket. The blanket may be offered in various sizes, child, adult, stroller, etc. and with various accessories such as clasps, hoods, gloves, etc. Or, for various purposes such as sporting events, for athletes or for spectators, for hunting, camping, construction, first aide, disaster relief and so on.

For example, the controller may be integrated with the battery, this may reduce price but sacrifice some convenience. Or the controller may be integral to the blanket, this would likely mean the blanket wouldn't be washable. The system described earlier made use of 12 Volts DC for the convenience of using readily available batteries and electric blankets, but it may be easily designed to work effectively with other convenient voltages, such as those found in portable laptop computers, or cell phones to make use of technologies available in these areas.

The individual would wrap the rechargeable battery operated heating blanket or piece of rechargeable battery operated piece of clothing around them in a comfortable manner and adjust the controller switch to their desired level of comfortable heat.

The present invention may be used to heat up water pipes that have a tendency to freeze in sub-freezing temperatures thereby allowing water to flow freely to the end user, or for delivery services that have warm food that need those food items to stay warm until delivery, i.e., pizza delivery, caterers, etc.

Figure 2:
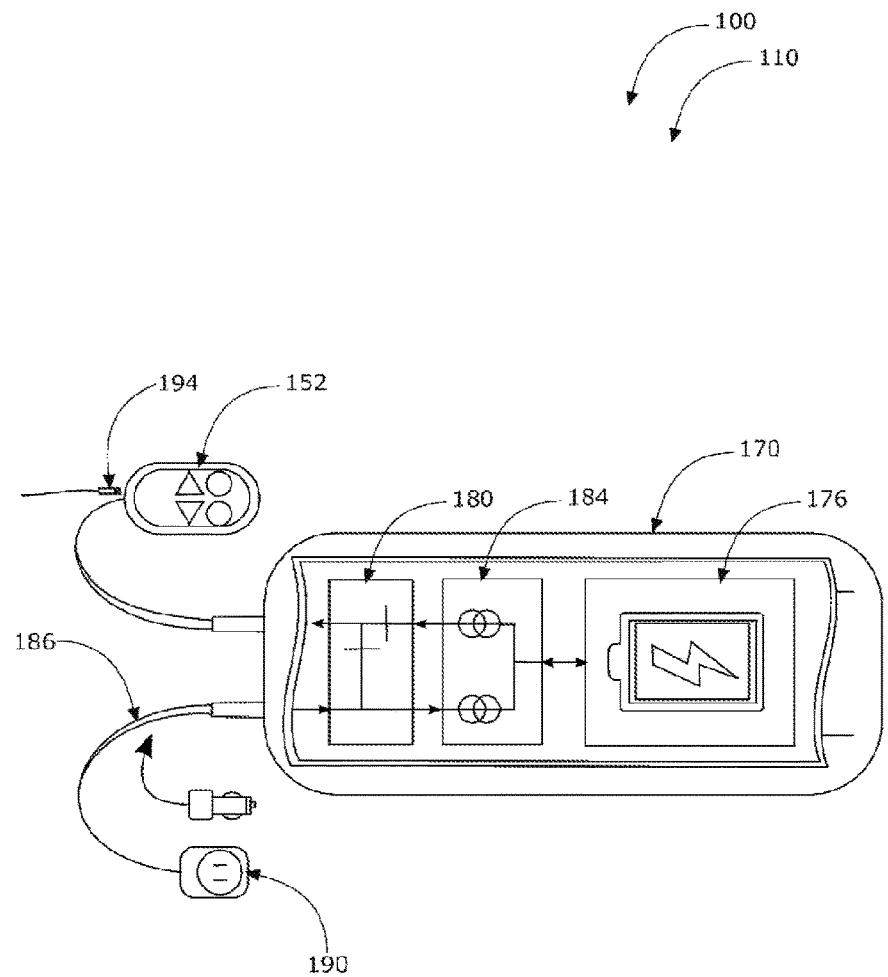
FIG. 2 is a perspective view illustrating the portable rechargeable li-polymer/lithium-ion battery cell operated heating blanket system comprising a portable rechargeable li-polymer/lithium-ion battery cell operated heating blanket assembly detailing the battery pack function according to an embodiment of the present invention of FIG. 1.
Figure 3:
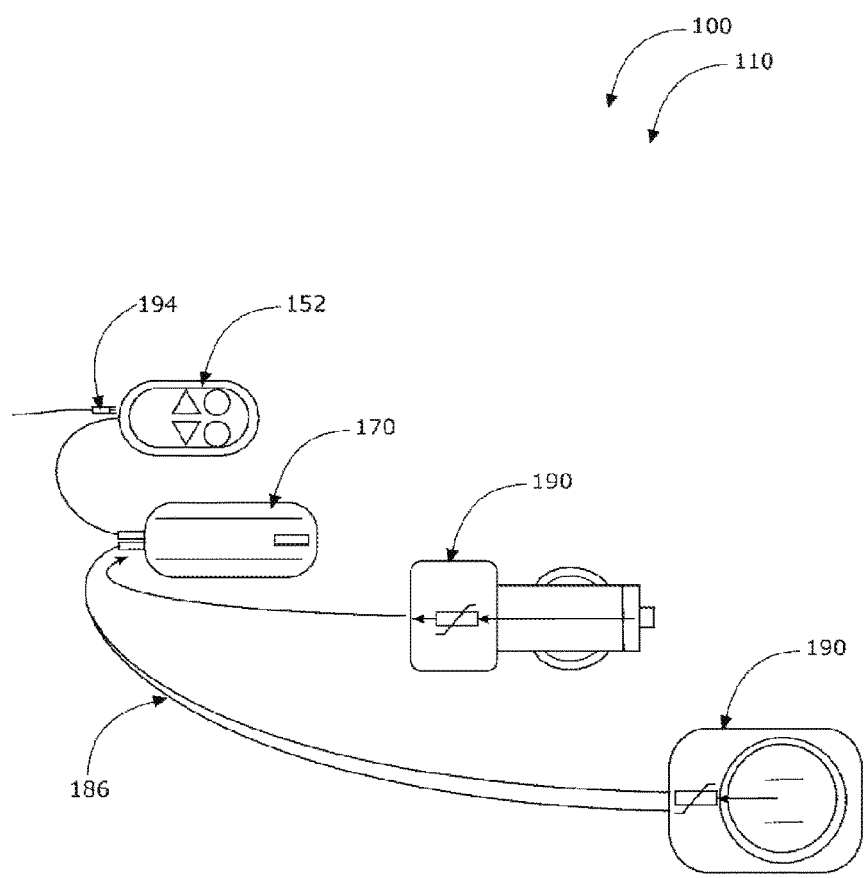
FIG. 3 is a perspective view illustrating portable rechargeable li-polymer/lithium-ion battery cell operated heating blanket assembly detailing the charging adaptors according to an embodiment of the present disclosure.

Referring to the drawings by numerals of reference there is shown in FIGS. 1-3, portable rechargeable li-polymer/lithium-ion battery cell operated heating blanket system 100 comprising: portable rechargeable li-polymer/lithium-ion battery cell operated heating blanket assembly 110 having at least one blanket 120 including exterior side 122, interior side 128, heating elements 130, temperature sensor 136, and wiring 138, at least one controller 152 including switching circuit 154, and control circuit 158, power source 166 having rechargeable battery pack 170 including rechargeable battery cell 176, steering circuit 180, and safety circuit 184, charger 186, charging adaptor 190, and controller to blanket connector 194.

Portable rechargeable li-polymer/lithium-ion battery cell operated heating blanket system 100 comprising: portable rechargeable li-polymer/lithium-ion battery cell operated heating blanket assembly 110 having at least one blanket 120 including exterior side 122, interior side 128, heating elements 130, temperature sensor 136, and wiring 138, at least one controller 152 including switching circuit 154, and control circuit 158, power source 166 having rechargeable battery pack 170 including rechargeable battery cell 176, steering circuit 180, and safety circuit 184, charger 186, charging adaptor 190, and controller to blanket connector 194 structured and arranged in functional combination.

At least one blanket 120 comprises exterior side 122, interior side 128, heating elements 130, temperature sensor 136, and wiring 138. At least one controller 152 comprises switching circuit 154 and control circuit 158. Power source 166 comprises rechargeable battery pack 170. Rechargeable battery pack 170 comprises rechargeable battery cell 176, steering circuit 180, and safety circuit 184. At least one blanket 120 is configured to connect and disconnect from at least one controller 152, power source 166, and charger 186. Exterior side 122 comprises at least one decoration 124. At least one decoration 124 may be imprinted, embroidered, and embossed with desired graphics.

At least one controller 152 monitors temperature, sets temperature, controls heating zones and timer functions. Controller 152 is weather resistant. At least one controller 152 controls flow of electricity between power source and at least one blanket 120. At least one controller 152 is built around an electronically controlled switch. Switch is controlled by a micro-computer chip which also monitors temperature sensor and user input. Switch is operated by control circuit 158 which receives input from a user. Control circuit 158 will operate switch if a desired temperature is higher than a sensed temperature and allow electricity to flow to at least one blanket thus heating it. Steering circuit 180 controls flow of said electricity from rechargeable battery pack 170 to at least one controller 152. Steering circuit 180 controls flow of electricity from charger 186 to at least one controller 152 to allow rechargeable battery pack to be charged while charger 186 also powers at least one controller 152. Safety circuit 184 prevents unpredictable outside events from damaging portable rechargeable li-polymer/lithium-ion battery cell operated heating blanket assembly 110. Safety circuit 184 regulates charging and discharging as well as monitoring health of rechargeable battery pack 170. Control circuit 158 receives feedback from temperature sensor 136 inside at least one blanket 120.

Portable rechargeable li-polymer/lithium-ion battery cell operated heating blanket assembly 110 is useful for providing comfortable heat to a human body and sustaining comfortable heat.

Steering circuit 180 comprises two schottky diodes. Exterior side 122 comprises pockets 126 for holding at least one item. Exterior side 122 comprises a weather resistant decorative material. Exterior side 122 comprises at least one decoration 124. At least one decoration 124 comprises an ornamental design suitable for ready recognition by user. Charging adaptor 190 is a wall adaptor. Charging adaptor 190 is a car adaptor. Power source 166 comprises a 12 volt dc, light weight, li-on rechargeable battery. At least one controller 152 is designed to heat multiple zones of at least one blanket 120. Portable rechargeable li-polymer/lithium-ion battery cell operated heating blanket assembly 110 is designed to detect component failures. Switch of portable rechargeable li-polymer/lithium-ion battery cell operated heating blanket assembly 110 in a result of component failure defaults to an off-position. Wiring 138, heating elements 130, and temperature sensor 136 are encapsulated within a watertight, flexible fire resistant material housing for safety and durability in use. At least one blanket 120 is weather resistant and washable. Switch comprises a relay or a transistor.

Figure 4:
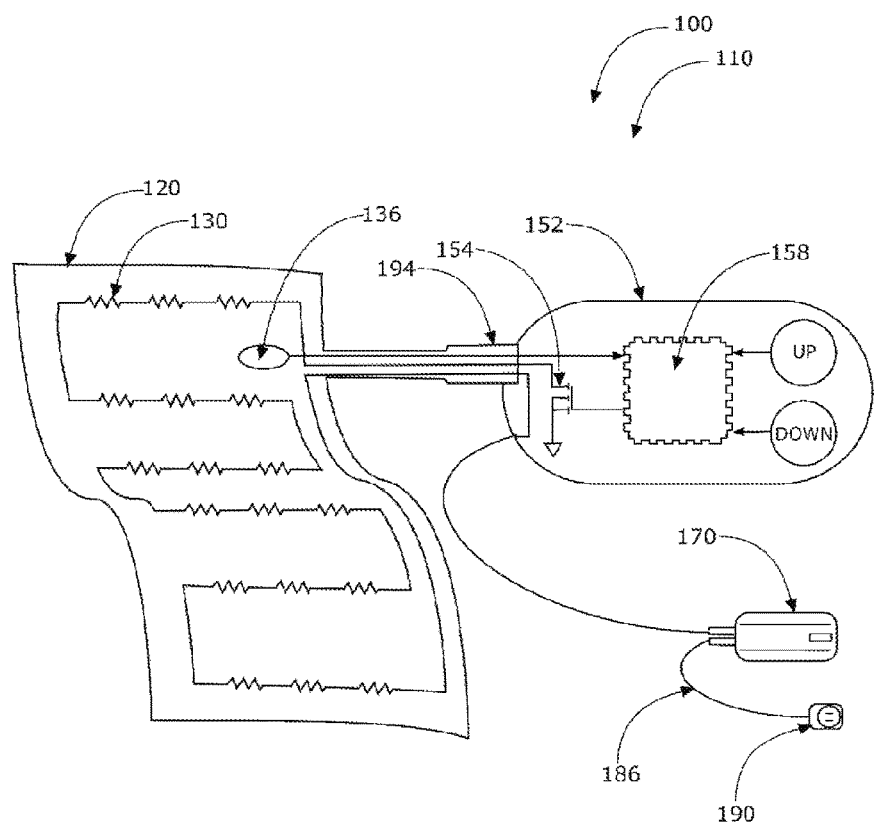
FIG. 4 is a diagram illustrating portable rechargeable li-polymer/lithium-ion battery cell operated heating blanket assembly detailing the user controller interface and blanket interior according to an embodiment of the present disclosure.

Referring now to FIG. 4, showing portable rechargeable li-polymer/lithium-ion battery cell operated heating blanket system 100. Portable rechargeable li-polymer/lithium-ion battery cell operated heating blanket system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different indicia combinations, parts may be sold separately, etc., may be sufficient.

Figure 5:
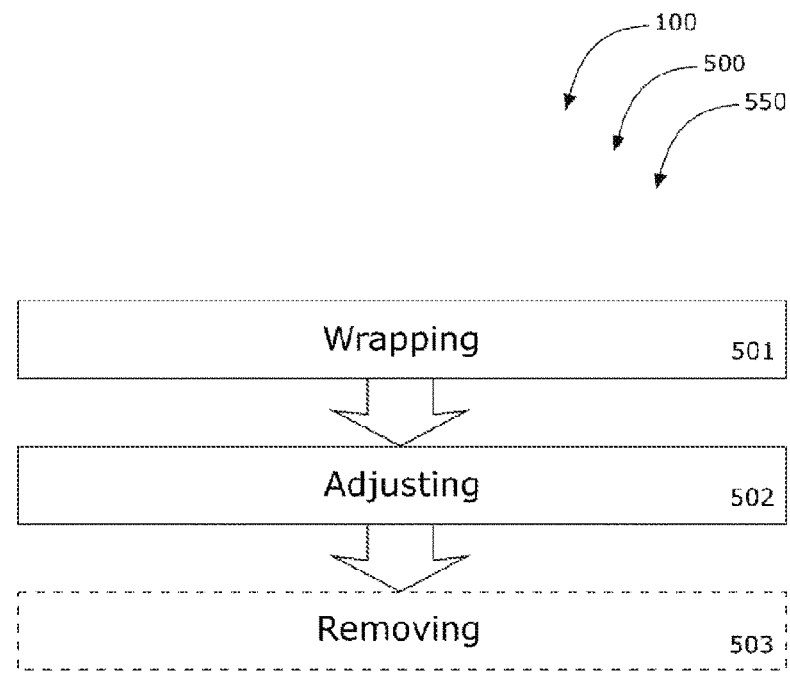
FIG. 5 is a flow diagram illustrating a method of use for portable rechargeable li-polymer/lithium-ion battery cell operated heating blanket system according to an embodiment of the present disclosure.

Referring now to FIG. 5 showing a flow diagram 550 illustrating method of use 500 for portable rechargeable li-polymer/lithium-ion battery cell operated heating blanket system 100 according to an embodiment of the present invention of FIGS. 1-4. As shown, method of use 500 may comprise the steps of: step one 501, wrapping at least one blanket 120 around a body of a user; step two 502, adjusting a switch of at least one controller 152 to desired temperature; step three 503, removing at least one blanket 120.

It should be noted that step three 503 is an optional step and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A portable rechargeable li-polymer/lithium-ion battery cell operated heating blanket system comprising:
   a portable rechargeable li-polymer/lithium-ion battery cell operated heating blanket assembly having;
   at least one blanket including;
      an exterior side;
      an interior side;
      heating elements;
      a temperature sensor; and
      wiring;
   at least one controller including;
      a switching circuit; and
      a control circuit;
   a power source having;
      a rechargeable battery pack including;
         a rechargeable battery cell;
         a steering circuit; and
         a safety circuit;
      a charger;
      a charging adaptor; and
      a controller to blanket connector;
   wherein said portable rechargeable li-polymer/lithium-ion battery cell operated heating blanket system comprises said a portable rechargeable li-polymer/lithium-ion battery cell operated heating blanket assembly;
   wherein said a portable rechargeable li-polymer/lithium-ion battery cell operated heating blanket assembly comprises said at least one blanket, said at least one controller, said power source, said charger, said charging adaptor, and said controller to blanket connector structured and arranged in functional combination;
   wherein said at least one blanket comprises said exterior side, said interior side, said heating elements, said temperature sensor, and said wiring;
   wherein said at least one controller comprises said switching circuit and said control circuit;
   wherein said power source comprises said rechargeable battery pack;
   wherein said rechargeable battery pack comprises said rechargeable battery cell, said steering circuit, and said safety circuit;
   wherein said at least one blanket is configured to connect and disconnect from said at least one controller, said power source, and said charger;
   wherein said exterior side comprises at least one decoration;
   wherein said at least one decoration may be imprinted, embroidered, or embossed with desired graphics;
   wherein said at least one controller monitors temperature, sets temperature, controls heating zones and timer functions;
   wherein said controller is weather resistant;
   wherein said at least one controller controls flow of electricity between said power source and said at least one blanket;
   wherein said at least one controller is built around an electronically controlled switch;
   switch is controlled by a micro-computer chip which also monitors said temperature sensor and user input;
   wherein said switch is operated by said control circuit which receives input from said user;
   wherein said control circuit will operate said switch if a desired temperature is higher than a sensed temperature and allow said electricity to flow to said at least one blanket thus heating it;
   wherein said safety circuit regulates charging and discharging as well as monitoring health of said rechargeable battery pack;
   wherein said steering circuit controls said flow of said electricity from said rechargeable battery pack to said at least one controller;
   wherein said steering circuit controls said flow of said electricity from said charger to said at least one controller to allow said rechargeable battery pack to be charged while said charger also powers said at least one controller;
   wherein said safety circuit prevents unpredictable outside events from damaging said portable rechargeable li-polymer/lithium-ion battery cell operated heating blanket assembly;
   wherein said control circuit receives feedback from said temperature sensor inside said at least one blanket; and
   wherein said portable rechargeable li-polymer/lithium-ion battery cell operated heating blanket assembly is useful for providing comfortable heat to a human body and sustaining said comfortable heat.

2. The portable rechargeable li-polymer/lithium-ion battery cell operated heating blanket system of claim 1 wherein said steering circuit comprises two schottky diodes.

3. The portable rechargeable li-polymer/lithium-ion battery cell operated heating blanket system of claim 1 wherein said exterior side comprises pockets for holding at least one item.

4. The portable rechargeable li-polymer/lithium-ion battery cell operated heating blanket system of claim 1 wherein said exterior side comprises a weather resistant decorative material.

5. The portable rechargeable li-polymer/lithium-ion battery cell operated heating blanket system of claim 4 wherein said exterior side comprises at least one decoration.

6. The portable rechargeable li-polymer/lithium-ion battery cell operated heating blanket system of claim 5 wherein said at least one decoration comprises an ornamental design suitable for ready recognition by said user.

7. The portable rechargeable li-polymer/lithium-ion battery cell operated heating blanket system of claim 1 wherein said charging adaptor is a wall adaptor.

8. The portable rechargeable li-polymer/lithium-ion battery cell operated heating blanket system of claim 1 wherein said charging adaptor is a car adaptor.

9. The portable rechargeable li-polymer/lithium-ion battery cell operated heating blanket system of claim 1 wherein said power source comprises a 12 Volt DC, light weight, Li-on rechargeable battery.

10. The portable rechargeable li-polymer/lithium-ion battery cell operated heating blanket system of claim 1 wherein said at least one controller is designed to heat multiple zones of said at least one blanket.

11. The portable rechargeable li-polymer/lithium-ion battery cell operated heating blanket system of claim 1 wherein said portable rechargeable li-polymer/lithium-ion battery cell operated heating blanket assembly is designed to detect component failures.

12. The portable rechargeable li-polymer/lithium-ion battery cell operated heating blanket system of claim 11 wherein said switch of said portable rechargeable li-polymer/lithium-ion battery cell operated heating blanket assembly in a result of said component failure defaults to an off-position.

13. The portable rechargeable li-polymer/lithium-ion battery cell operated heating blanket system of claim 1 wherein said wiring, said heating elements, and said temperature sensor are encapsulated within a watertight, flexible fire resistant material housing for safety and durability in use.

14. The portable rechargeable li-polymer/lithium-ion battery cell operated heating blanket system of claim 1 wherein said at least one blanket is weather resistant and washable.

15. The portable rechargeable li-polymer/lithium-ion battery cell operated heating blanket system of claim 1 wherein said switch comprises a relay.

16. The portable rechargeable li-polymer/lithium-ion battery cell operated heating blanket system of claim 1 wherein said switch comprises a transistor.

17. A portable rechargeable li-polymer/lithium-ion battery cell operated heating blanket system comprising:
- a portable rechargeable li-polymer/lithium-ion battery cell operated heating blanket assembly having;
  - at least one blanket including;
    - an exterior side;
    - an interior side;
    - heating elements;
    - a temperature sensor; and
    - wiring;
  - at least one controller including;
    - a switching circuit; and
    - a control circuit;
  - a power source having;
    - a rechargeable battery pack including;
      - a rechargeable battery cell;
      - a steering circuit; and
      - a safety circuit;
  - a charger;
  - a charging adaptor; and
  - a controller to blanket connector;
- wherein said portable rechargeable li-polymer/lithium-ion battery cell operated heating blanket system comprises said a portable rechargeable li-polymer/lithium-ion battery cell operated heating blanket assembly;
- wherein said a portable rechargeable li-polymer/lithium-ion battery cell operated heating blanket assembly comprises said at least one blanket, said at least one controller, said power source, said charger, said charging adaptor, and said controller to blanket connector structured and arranged in functional combination;
- wherein said at least one blanket comprises said exterior side, said interior side, said heating elements, said temperature sensor, and said wiring;
- wherein said at least one blanket is weather resistant and washable;
- wherein said wiring, said heating elements, and said temperature sensor are encapsulated within a watertight, flexible fire resistant material housing for safety and durability in use;
- wherein said at least one controller comprises said switching circuit and said control circuit;
- wherein said portable rechargeable li-polymer/lithium-ion battery cell operated heating blanket assembly is designed to detect component failures;
- wherein said switch of said portable rechargeable li-polymer/lithium-ion battery cell operated heating blanket assembly in a result of said component failure defaults to an off-position;
- wherein said power source comprises said rechargeable battery pack;
- wherein said power source comprises a 12 Volt DC, light weight, Li-on rechargeable battery;
- wherein said rechargeable battery pack comprises said rechargeable battery cell, said steering circuit, and said safety circuit;
- wherein said at least one blanket is configured to connect and disconnect from said at least one controller, said power source, and said charger;
- wherein said exterior side comprises a weather resistant decorative material;
- wherein said exterior side comprises at least one decoration;
- wherein said at least one decoration comprises an ornamental design suitable for ready recognition by said user;
- wherein said exterior side comprises pockets for holding at least one item;
- wherein said at least one decoration may be imprinted, embroidered, or embossed with desired graphics;
- wherein said charging adaptor is a wall adaptor;
- wherein said at least one controller monitors temperature, sets temperature, controls heating zones and timer functions;
- wherein said controller is weather resistant;
- wherein said at least one controller controls flow of electricity between said power source and said at least one blanket;
- wherein said at least one controller is designed to heat multiple zones of said at least one blanket;
- wherein said at least one controller is built around an electronically controlled switch;
- switch is controlled by a micro-computer chip which also monitors said temperature sensor and user input;
- wherein said switch is operated by said control circuit which receives input from said user;
- wherein said switch comprises a relay;
- wherein said control circuit will operate said switch if a desired temperature is higher than a sensed temperature and allow said electricity to flow to said at least one blanket thus heating it;
- wherein said safety circuit regulates charging and discharging as well as monitoring health of said rechargeable battery pack;
- wherein said steering circuit controls said flow of said electricity from said rechargeable battery pack to said at least one controller;
- wherein said steering circuit comprises two schottky diodes;
- wherein said steering circuit controls said flow of said electricity from said charger to said at least one controller to allow said rechargeable battery pack to be charged while said charger also powers said at least one controller;

wherein said safety circuit prevents unpredictable outside events from damaging said portable rechargeable li-polymer/lithium-ion battery cell operated heating blanket assembly;

wherein said control circuit receives feedback from said temperature sensor inside said at least one blanket; and wherein said portable rechargeable li-polymer/lithium-ion battery cell operated heating blanket assembly is useful for providing comfortable heat to a human body and sustaining said comfortable heat.

\* \* \* \* \*